Dec. 29, 1931.   F. F. SILVA   1,838,670
ATTACHMENT FOR HAYRAKES
Filed Sept. 1, 1928   3 Sheets-Sheet 2
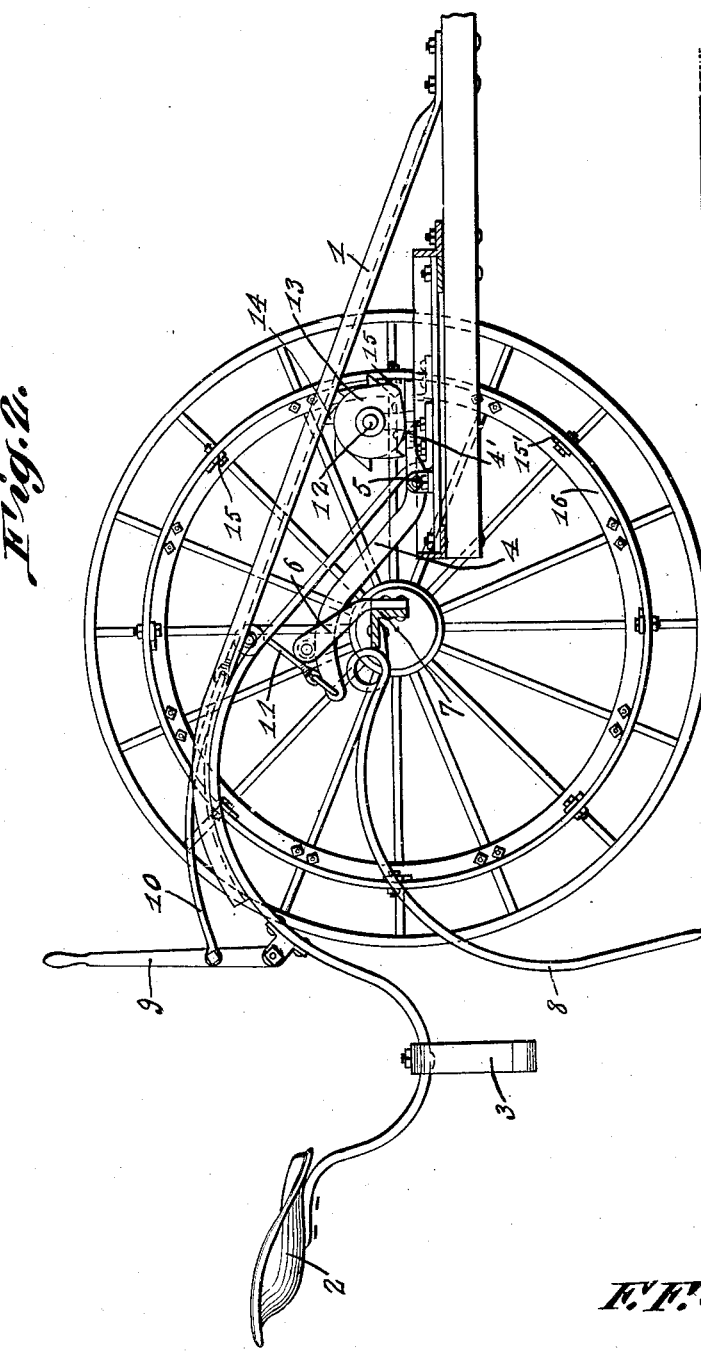

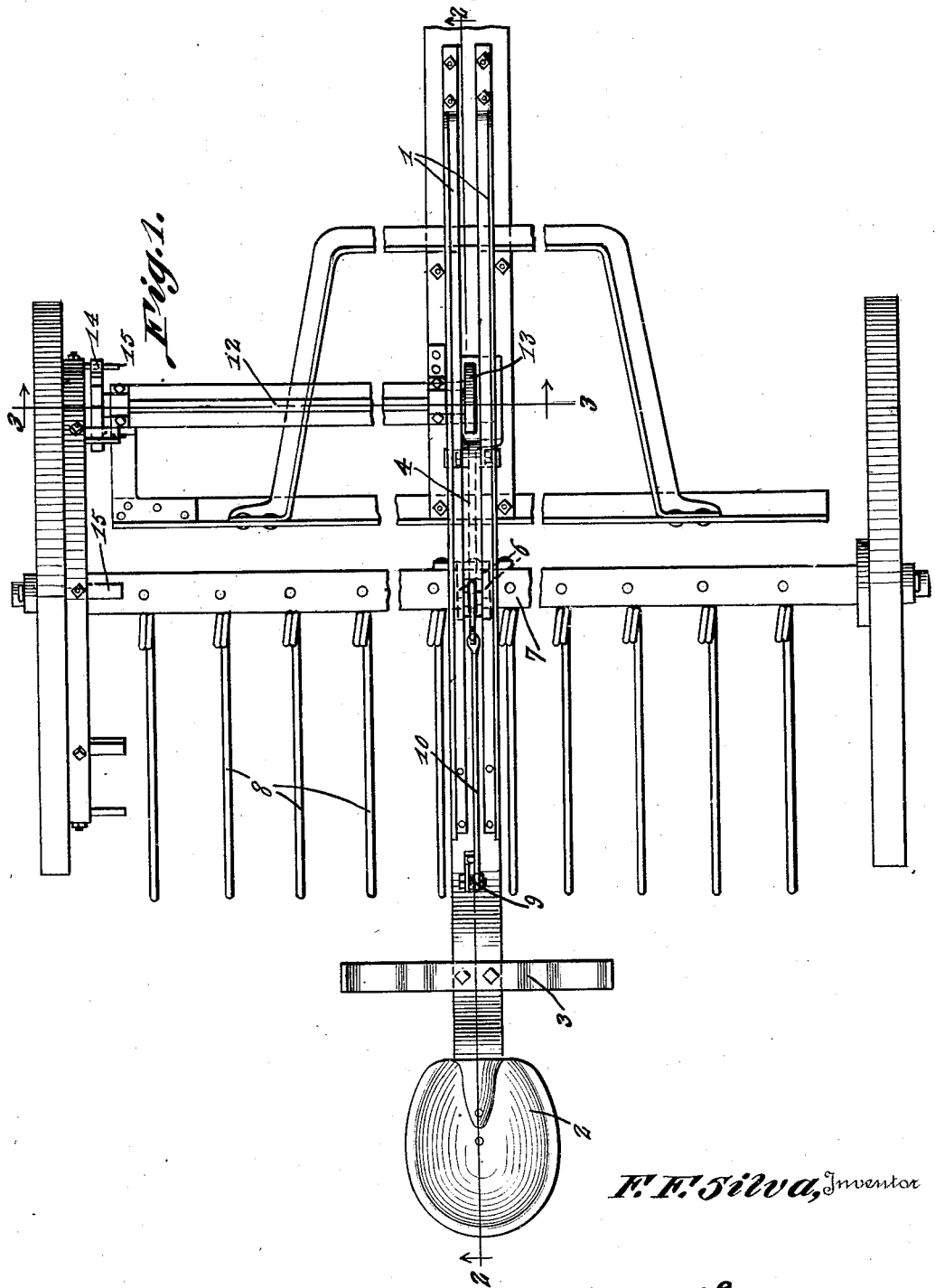

Dec. 29, 1931.  F. F. SILVA  1,838,670
ATTACHMENT FOR HAYRAKES
Filed Sept. 1, 1928  3 Sheets-Sheet 3
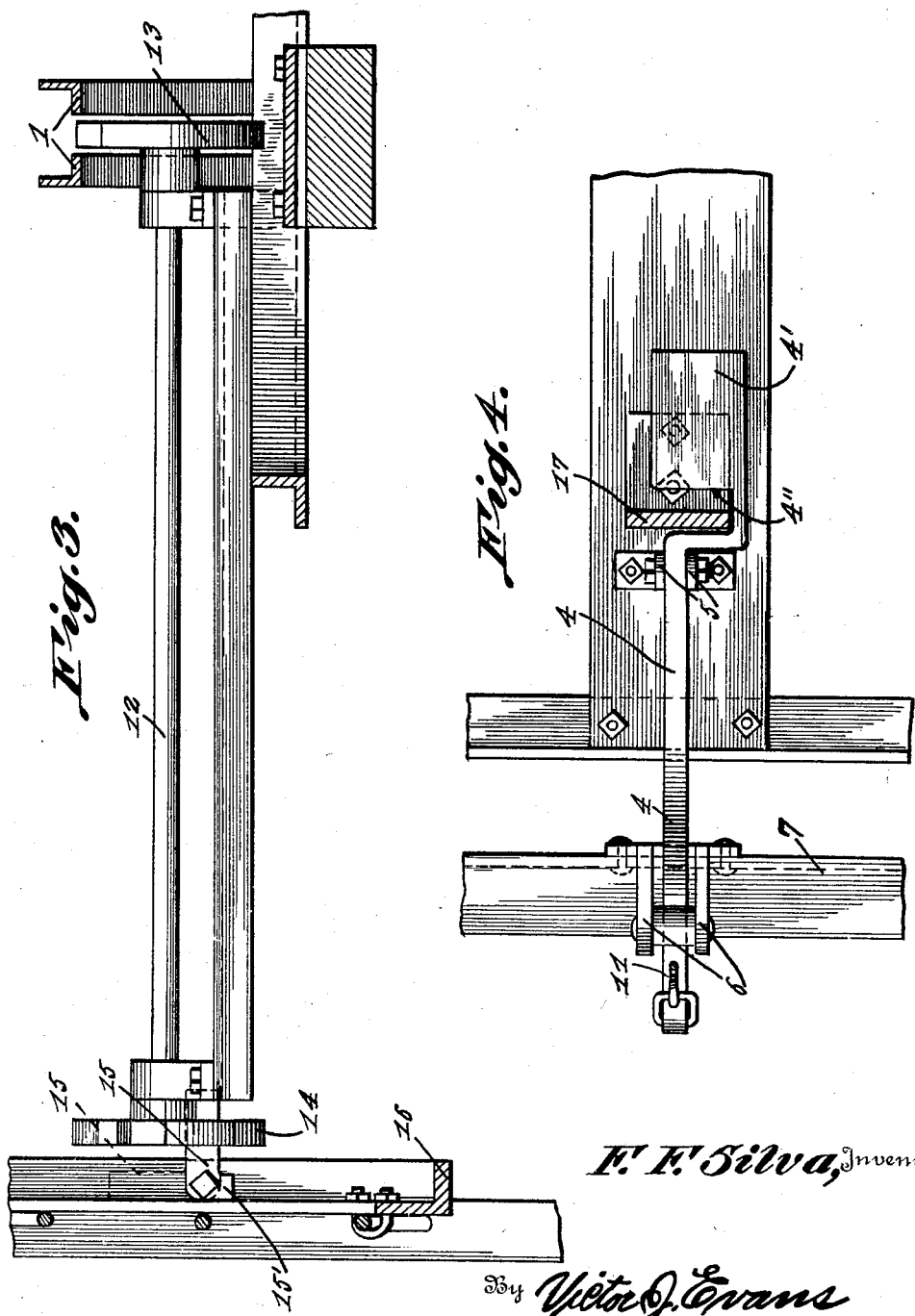

Patented Dec. 29, 1931

1,838,670

UNITED STATES PATENT OFFICE

FRANK F. SILVA, OF WOODLAND, CALIFORNIA

ATTACHMENT FOR HAYRAKES

Application filed September 1, 1928. Serial No. 303,488.

This invention relates to improvements in hay rakes, the general object of the invention being to so construct the parts that the seat is arranged in rear of the teeth so that if the operator should happen to fall from the seat, he would not be injured by the teeth and also to provide means driven from one of the ground wheels for automatically dumping the rake and to provide means for dumping the rake by hand.

A further object of the invention is to provide means whereby the wheel operated means may be set to dump the rake at any desired time so that the windrows can be placed various distances apart.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the improved rake.

Figure 2 is a section on line 2—2 of Figure 1.

Figure 3 is a section on line 3—3 of Figure 1.

Figure 4 is a detail plan view showing the dumping lever.

In these views, the numeral 1 indicates an elongated frame which is attached to the front part of the rake frame and which is of curved construction to pass over the teeth of the rake and extends well in rear of the teeth, with a seat 2 attached to its rear end, this frame also carrying the foot rest 3 for the occupant of the seat.

A trip lever 4 for raising the teeth is pivotally connected with a part of the frame, as shown at 5, the rear end of the lever passing through the member 6 which is attached to the angle bar 7 which carries the pintles and to which the teeth 8 of the rake are attached so that when the rake end of this lever moves upwardly, it will rock the member 7 and thus raise the teeth to dumping position. A hand lever 9 is pivoted to the rear part of the frame 1 at a point where it can be easily grasped by the occupant of the seat 2 and a rod 10 is pivoted to the lever and is connected by a cable 11 with the rear end of the lever 4 so that by pulling the lever 9 toward the seat, the lever 4 will be lifted to raise the teeth.

I also provide means for automatically operating the lever 4, such means comprising a transversely arranged shaft 12 journaled in the frame of the rake, with a cam 13 fastened to one end of the shaft for engaging the flat front part 4' of the lever and with a toothed wheel 14 fastened to its other end, the teeth of which are adapted to be engaged by the dogs 15 pivoted to a band 16 fastened to the spokes of one of the wheels of the rake. Each dog 15 is of substantially L-shape in cross section with its short arm 15' acting as a stop to hold the long arm thereof in operative position when the dog is placed with the long arm extending at right angles to the vertical plane of the wheel. By swinging the long arm of each dog inwardly, as shown in dotted lines in Figure 3, the dog will not engage the teeth of the wheel 14.

From the foregoing it will be seen that when the dogs are in operative position, they will strike the teeth of the wheel 14 as they come opposite the wheel and thus the shaft will be given a step by step movement as the rake travels along and thus as the high part of the cam engages the flat part 4' of the lever 4, the lever will be depressed and its rear end raised to lift the rake teeth to dumping position. By moving some of the dogs into operative position and others into inoperative position, the dumping action can be checked so that the teeth will not be raised to dumping position as often as they would if all the dogs were moved to operative position. Thus the automatic dumping device can be set to dump the rake as desired and in accordance with the material being handled so that the windrows can be spaced any distance apart. As shown in Figure 4, the lever 4 is shaped to form a recess 4" so that it will extend around the spring 17 which supports the seat frame 1 from the main frame of the rake.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. In combination with a rake, a dumping lever carried thereby, a shaft journaled in the rake frame, a cam fastened to the shaft and engaging a part of the dumping lever to actuate the same, a toothed wheel fastened to the shaft and an annular row of dogs carried by one of the ground wheels of the rake for successively engaging the toothed wheel for rotating the same in a step by step manner.

2. In combination with a rake, a dumping lever carried thereby, a shaft journaled in the rake frame, a cam fastened to the shaft and engaging a part of the dumping lever to actuate the same, a toothed wheel fastened to the shaft, an annular row of dogs carried by one of the ground wheels of the rake for successively engaging the toothed wheel for rotating the same in a step by step manner and means whereby each dog can be moved to inoperative position to control the dumping action of the lever.

In testimony whereof I affix my signature.

FRANK F. SILVA.